Dec. 24, 1929.    H. GADEGAST    1,740,941
INDICATING DIAL
Filed Aug. 6, 1928
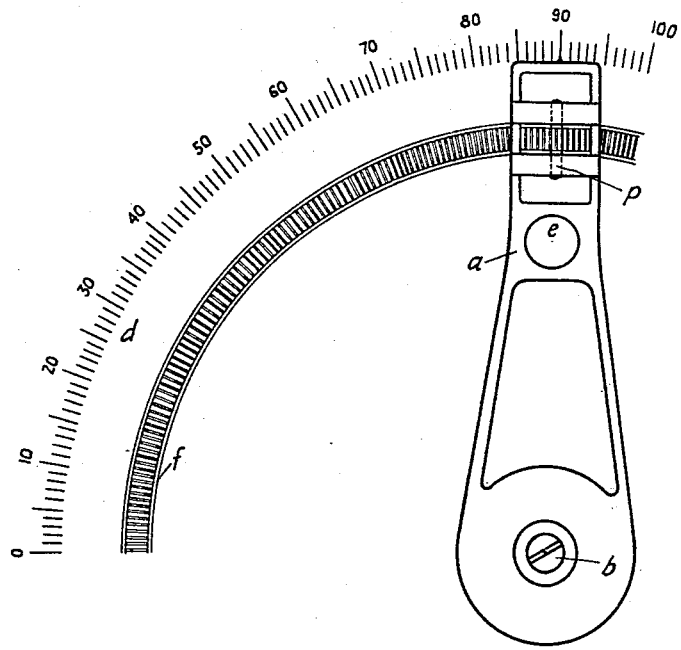
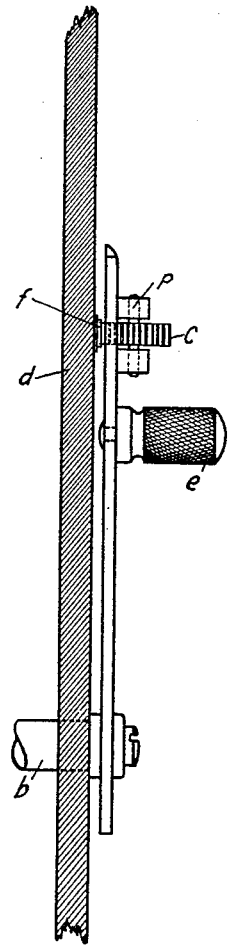
INVENTOR
BY Hermann Gadegast
Ira J Adams
ATTORNEY Patented Dec. 24, 1929

1,740,941

UNITED STATES PATENT OFFICE

HERMANN GADEGAST, OF TEMPELHOF, NEAR BERLIN, GERMANY, ASSIGNOR TO ALLGE-MEINE ELEKTRIZITATS-GESELLSCHAFT, OF BERLIN, GERMANY

INDICATING DIAL

Application filed August 6, 1928, Serial No. 297,822, and in Germany August 9, 1927.

This invention relates to indicating dials and more particularly to indicating dials for the tuning means of radio receivers.

The object of the invention is to provide an indicating hand which may move relatively to a dial so as to prevent rolling contact between the hand and the dial to the damage of either or both. At the same time means is provided to permit a ready and accurate adjustment of the indicating hand on the dial.

The setting of indicators or hands, especially in radio receiver apparatus, is usually effected by the agency of a lever secured upon a spindle which lever travels over the scale or dial. In order to permit a ready and accurate adjustment, according to the invention, the setting hand is furnished with a roller or a minute wheel so constructed that the indicator hand will not be made to slide over the scale to damage the latter.

The invention is illustrated in the accompanying drawings, wherein Fig. 1 represents a plan view and Fig. 2 an elevation of the device.

The indicator hand $a$ is secured upon the rotary shaft or spindle $b$. In the neighborhood of the free end of the indicator, there is revolubly supported on a pivot $p$ the roller $c$, the latter travelling directly on the cover plate $d$, that is, the scale or dial. Now, if the indicator or setting hand $a$ is actuated by means of the knob $e$, the indicator $a$ can not be pressed into contact with the scale, since it is made to travel over the scale at a certain distance therefrom because of the roller $c$. By turning the roller $c$, for instance, with the thumb, extremely fine adjustment is obtainable. The degree of fine adjustment is variable by altering the distance between the roller and the axis $b$. By this arrangement an extremely precise adjustment is possible.

The roller $c$ and the knob $e$ may be knurled to permit accurate handling. If desired, the roller $c$ may be toothed and a track $f$ may be provided to receive the teeth of the roller $c$. This will permit more positive adjustment.

It should be understood that the hand $a$ may be stationary and the dial $d$ movable. In such event, the principle of the invention would remain the same.

Likewise, the invention may be applied to devices other than radio receivers, such as range finders, surveying instruments, compound microscopes, and other devices where accurate and rapid setting is desirable.

What I claim is:

1. A radio indicator comprising a dial and an indicating hand relatively movable to each other, means to effect such movement, and means for minute and positive adjustments of the indicating hand relative to the dial.

2. Indicating means comprising a dial and an indicating hand relatively movable to each other, and means on said dial and hand for minute and positive adjustments between said indicating hand and dial.

3. Indicating means comprising a dial and an indicating hand relatively movable to each other, a track on said dial, and a roller at the end of the indicating hand in contact with said track.

4. Indicating means comprising a dial, an indicating hand pivotally mounted on said dial for relative movement thereto, and a roller at the free end of the indicating hand positively cooperating with said dial for minute adjustments of the handle on the dial.

5. Indicating means comprising a dial, an indicating hand pivotally mounted on said dial for relative movement thereto, and a roller at the free end of the indicating hand, said roller being positively mounted on the dial for minute movements relative thereto.

6. Indicating means comprising a dial, an indicating hand pivotally mounted at one end for movement relative to the dial, a roller at the indicating point of the indicating hand mounted on an axis perpendicular to the pivot of said hand, the said roller being constructed to permit minute and positive adjustments of the hand relative to the dial.

7. An indicator comprising a dial, a pointer, a track on said dial, and means movably mounted on said pointer, in rolling contact with said track.

8. An indicator comprising a dial, a pointer relatively movable thereto and having only one free end, means mounted at said free end for minute and positive adjustments of the pointer relative to the dial.

9. An indicator comprising a dial, a pointer movably mounted thereon, independent means on said dial and pointer in positive rolling contact, said pointer means being adjustable.

10. An indicator comprising a dial, means providing an irregular path on said dial, a pointer, said pointer having one end fixed and the other end free, a roller, provided with an irregular periphery, rotatably mounted on said free end, the periphery of said roller being in contact with said path when said pointer is moved relative to said dial.

HERMANN GADEGAST.